Aug. 8, 1961   H. P. EICHIN ET AL   2,995,243
METHOD OF AND APPARATUS FOR CLASSIFYING UNIT ITEMS
Filed May 15, 1958   2 Sheets-Sheet 1
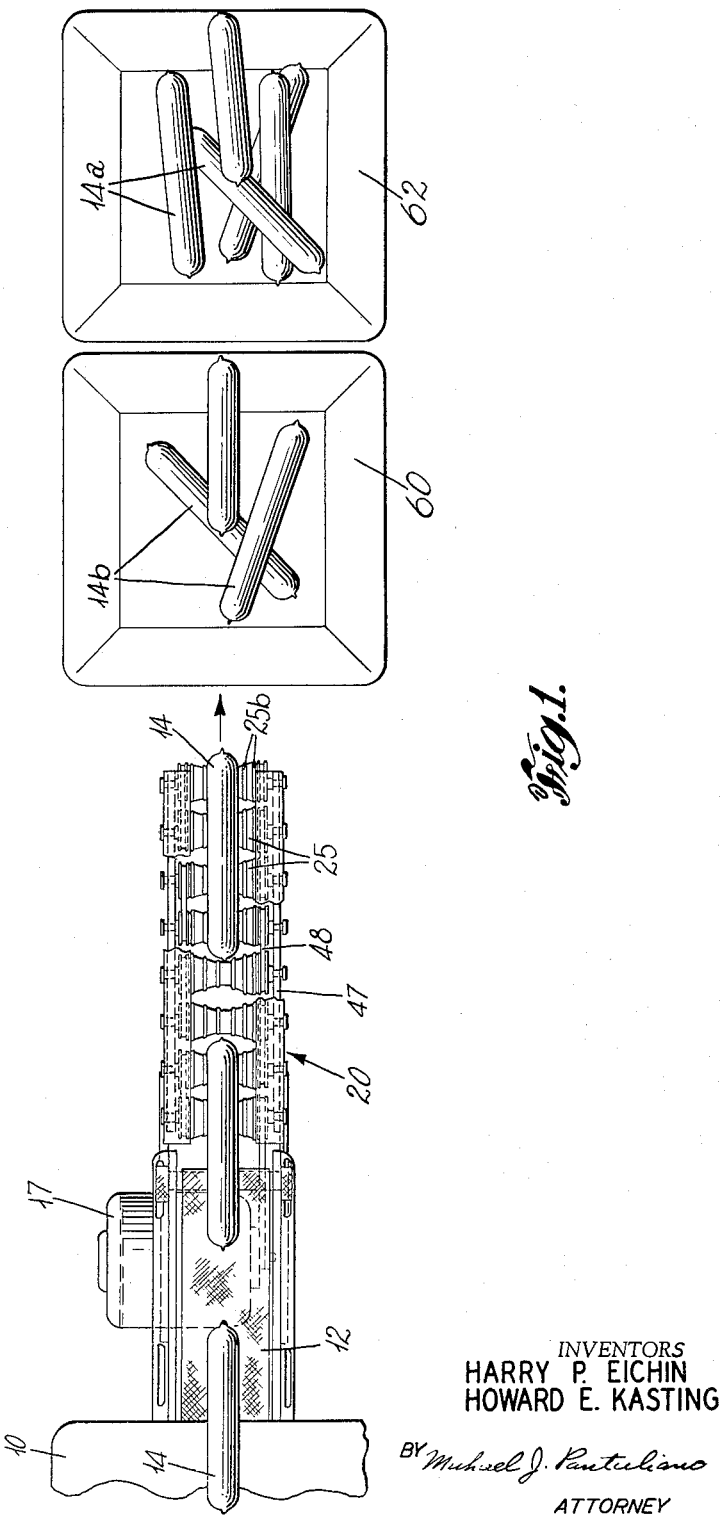
INVENTORS
HARRY P. EICHIN
HOWARD E. KASTING
BY Michael J. Pantulano
ATTORNEY

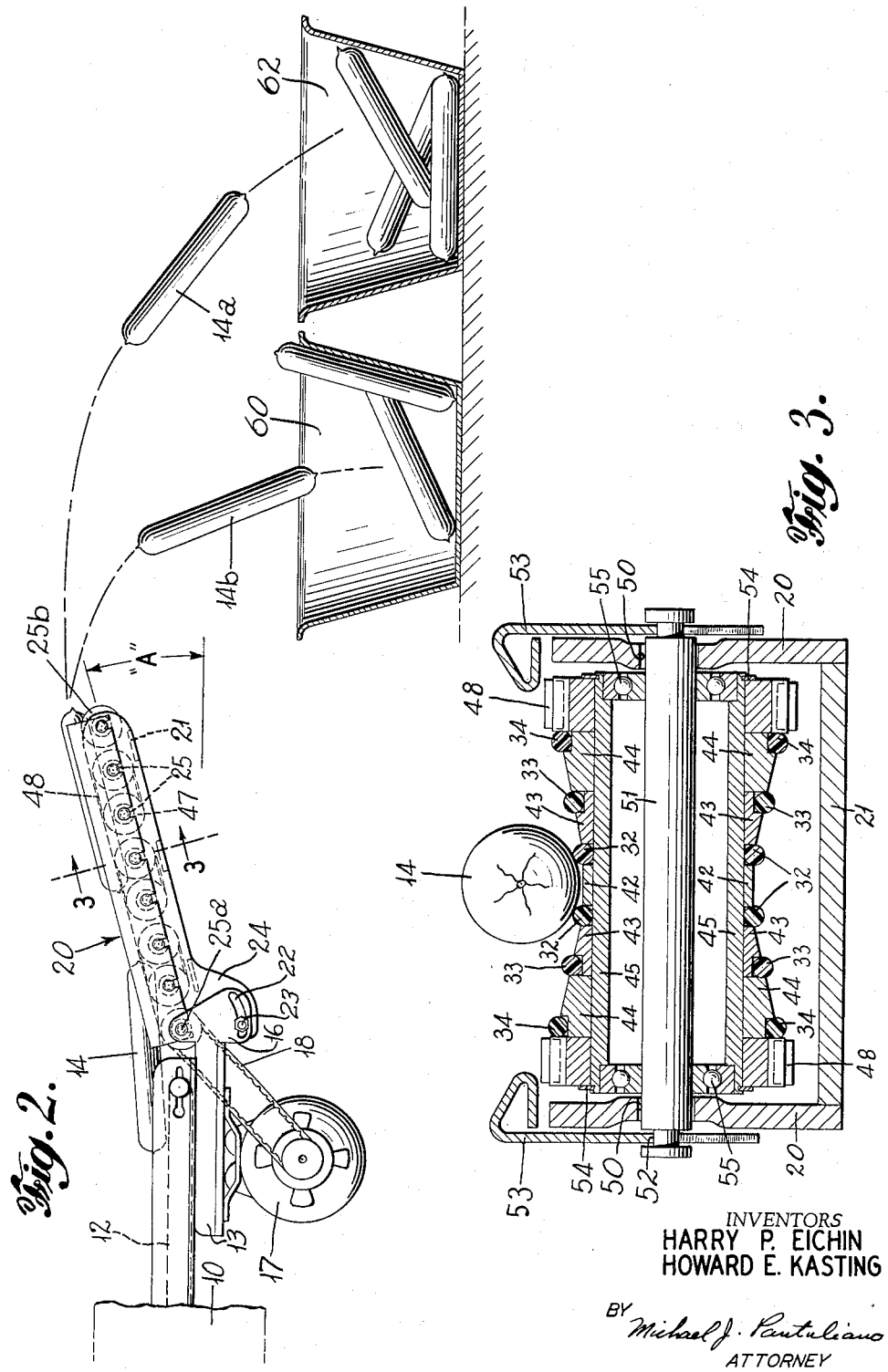

2,995,243
METHOD OF AND APPARATUS FOR CLASSIFYING UNIT ITEMS
Harry P. Eichin, Western Springs, and Howard E. Kasting, Park Forest, Ill., assignors to Union Carbide Corporation, a corporation of New York
Filed May 15, 1958, Ser. No. 735,553
17 Claims. (Cl. 209—118)

This invention relates to the classification and segregation of unit items. More particularly, it relates to an improved method of and apparatus for classifying and segregating cylindrical unit items such as skinless frankfurters from encased frankfurters.

In the production of skinless frankfurters, a cellulosic casing is stuffed with a sausage meat emulsion. The stuffed casing is then successively linked, cured as by smoking, cooked, and chilled, and finally, the casing is peeled from the individual frankfurters. The individual frankfurters are then packaged and shipped.

The peeling operation is performed mechanically by automatic peeling machines. In these machines, the frankfurters, after passing through the zone of action of the peeling operation are conveyed by a belt to a collection device, or to a station where the frankfurters are packaged for shipment. Though such peeling machines are highly efficient, nevertheless they do not peel the casing from all the frankfurters on which they operate. Because the encased frankfurters and the skinless frankfurters are very similar in appearance, encased frankfurters are frequently shipped as skinless frankfurters.

To manually separate the encased and skinless frankfurters from each other is a tedious and labor consuming operation, and also requires acute visual perception.

An object of this invention is to provide a method of and apparatus for automatically and expeditiously classifying and segregating cylindrical unit items whose surfaces have different coefficients of friction.

Another object of this invention is to provide a method of and apparatus for automatically and expeditiously classifying and segregating skinless and encased frankfurters.

Other and additional objects will become apparent hereafter.

The surfaces of skinless frankfurters have a higher coefficient of friction than the surfaces of the casings of the encased frankfurters and this invention is based hereon.

The objects of the invention are accomplished in general by delivering the frankfurters from the peeling machine onto a series of driven classifying surfaces adapted to frictionally engage said frankfurters. Because of their respective coefficients of friction, the encased frankfurters will be trajected from the terminal surface of the overdriven classifying surface a lesser distance than the skinless frankfurters, whereby classification is effected. After classification, the encased and skinless frankfurters are segregated and separately collected.

In the preferred form of the invention the classification and segregation are effected in combination with the peeling operation and accordingly, the frankfurters are delivered to the classifying surfaces by the discharge belt of the peeling machine.

Inasmuch as such belt travels at a relatively high speed, the successive frankfurters thereon are ejected therefrom on to the classification surfaces. The momentum imparted by this means of feeding the frankfurters to the classification surfaces does not effect the ensuing classification, although it does aid in aligning the frankfurters onto the series of classifying surfaces.

In the preferred embodiment of the invention, the classifying surfaces are comprised of a plurality of rolls, each having a shape comprised of two equal right conical frustums contiguous at the minor diameter, and each disposed at a right angle to the axis of frankfurter delivery. These rolls are rotatably overdriven in the direction of said frankfurter delivery at a surface speed greater than the speed of the frankfurter received thereon.

Preferably the arrangement of the overdriven rolls comprising the classification surfaces, is inclined upwardly from the horizontal so that additional momentum imparted to the frankfurters thereby, and particularly the skinless frankfurters, discharges the frankfurters in free trajectories. As a consequence thereof, the segregation of the encased frankfurters from the skinless frankfurters is effected.

The combination of the preferred surface material, the diameter and frustoconical slope, the number of rolls, and the overdriving speed of the classifying surfaces in contact with the frankfurter is such that the momentum imparted to the skinless frankfurters will traject them to a suitable collection receptacle greater than two frankfurter lengths past the terminal classifying surface. The above-indicated arrangement will likewise give a lesser momentum to the encased frankfurters, which will traject them to a suitable collection receptacle less than two frankfurter lengths past the terminal classifying surface.

The classifying surfaces should be dry and free of meat, fats, and other substances which will tend to decrease or alter the differences in coefficient of friction of the encased and of the skinless frankfurters.

As the classifying surfaces become so contaminated so as to modify discrimination between the coefficient of friction of the frankfurter surfaces, the classifying surfaces should be cleansed. A self-cleansing action is effected by the attachment of the classifying surfaces in the form of a plurality of rings of appropriate thickness and diameter, to the conical perimeter of each classifying roll unit whereby the rotating classifying rings overdriving the frankfurters, arcuately wipe the frankfurters cradled in linear movement by the plurality of classifying roll units. As a consequence thereof the cleansing and removal of the contaminating residues from the zone of classification is effected.

In general, the classifying surface can be made of any suitable material which is not corroded by frankfurters. It can be, for example, made of an appropriate metal, such as aluminum, stainless steel, etc.

It can likewise be formed of plastics and ceramics. It also can be formed of vulcanized fiber, glass, or other materials coated with a non-corrodible material, such as Teflon (polymerized tetrachlorethylene), metals, and the like.

In the preferred embodiment, the length of span of the classifying surfaces is greater than the length of the unit items fed thereto. Highly satisfactory results have been secured with a plurality of conical classifying rolls of 1-inch major diameter, spaced, central axis to central axis, a combined length approximately two times the length of the unit items to be classified, wherein the classifying surfaces are overdriven at a surface speed between approximately 400 and 1200 feet per minute.

The nature of the invention and the manner in which it may be practiced will become clear from the following description when taken in conjunction with the following drawings forming a part of this specification wherein:

FIGURE 1 is a top plan view of an apparatus embodying the principles of this invention for the classification and segregation of skinless and encased frankfurters, and in which the peeling mechanism is shown diagrammatically.

FIGURE 2 is a side elevation of the apparatus shown in FIGURE 1.

FIGURE 3 is a cross-sectional view of part of the frame and classifying rolls.

Referring now to the drawings wherein like reference numbers designate like parts, the reference numeral 10 designates an automatic peeling machine with a discharge conveyor 12 transporting and delivering the unsegregated frankfurters 14 to a sloping frame unit 20 supporting a plurality of classifying surfaces 25, which as herein described, serve to automatically classify and segregate skinless frankfurters 14a and encased frankfurters 14b from which the peeling mechanism failed to peel the casings. Inasmuch as the peeling machine 10 is well-known and available in the market and its specific details form no part of this invention, a detailed description of its construction and operation is not necessary.

As shown in FIGURES 1-2, the sloping frame 20 mounting the classifying surfaces 25 is positioned to receive a progression of unsegregated frankfurters 14 discharged from conveyor 12. Frame 20 is positioned at an angle "A," of approximately 15°, such as between 12° and 20°, above the horizontal delivery axis of the frankfurters 14 discharged from conveyor 12, whereby owing to the accelerating effect of the overdriving classifying rolls 25, the frankfurters 14 will be discharged in free-flight trajectories which segregate the encased ones 14b from the skinless frankfurters 14a. Inasmuch as conveyor 12 travels at a relatively high speed, the additional momentum necessary to traject the encased frankfurters 14b into the desired free-flight path, must be sufficient to cause these unit items to be transported upward along the slope of classifying rolls, so as to be trajected free of the terminal classifying surface 25b and to provide no interference with the progression of delivery from peeling machine 10. The additional momentum imparted to the skinless frankfurters 14a must be sufficient to cause them to be transported upward along the slope of classifying rolls so as to be trajected a suitable further distance beyond the terminal classifying surface 25b than the encased frankfurters, and preferably in excess of two frankfurter lengths from the terminal classifying surface.

Referring now particularly to FIGURE 3, the classifying surface 25 is comprised of a roll embodying a series of classifying rings 32, 33, 34, of different diameters and spaced from each other by a series of sleeves 42, 43, 44, assembled on quill 45 in a manner such that the assembly forms a roll shaped as two equal right conical frustums continguous at the diameter of spacer 42. The classifying rings 32, 33, 34, and sleeves 42, 43, 44 are retained axially in assembly by retaining rings 54 coacting through timing pulleys 48, and rotatably supported on shaft 51 by ball bearings 55.

The shaft 51 is assembled into frame 20 through suitably spaced holes 50, and retained in the side plates 20 of said frame by engagement of cover 53 in slot 52 of shaft 51.

Referring again to FIGURES 1 and 2, the classifying rolls 25 are rotatably driven through a train of cogged timing belts 48 and pulleys 47 affixed to rolls 25, and primarily driven by electric motor 17 and cogged belt 18. Side plates of frame 20 are suitably affixed to each other through cross members 21. A widened portion 24 of the side plates of frame 20 is centered at the axis of the initial classifying roll 25a and provides a clamping engagement to brackets 16, which are affixed for convenience to the peeling machine conveyor frame 13. An arcuate slot 22 and suitable fastening 23 permits adjustments of the frame angle "A."

In practice for the classification and segregation of frankfurters 6 inches long, highly satisfactory results are obtained when frame 20 is 11 inches long and 3 inches wide, angle "A" is 15°, eight classifying rolls 25 are used, which are comprised of an assembly of six Teflon (polymerized tetrachlorethylene) rings ⅓ inches thick, each consisting of three pairs having, respectively, ⅞, 1, and 1¼ inch internal diameters and spaced 1⅜ inches on centers, wherein said classifying rings 32, 33, 34 are over-driven at a peripheral speed of approximately 1100 feet per minute, and wherein the rate of delivery of the frankfurters is up to 200 per minute. Under these conditions, encased frankfurters 14b will be trajected a distance of less than two frankfurter lengths from the terminal surface, into receptacle 60 and skinless frankfurters 14a will be trajected a distance in excess of two frankfurter lengths from the terminal surface into receptacle 62.

As is clear from the foregoing, the classification and segregation of encased and skinless frankfurters is preferably carried out in combination with a peeling machine. However, a progression of frankfurters to be classified and segregated can be fed to the classifying and segregating surfaces in any other convenient manner.

Although the invention is particularly adapted to the classification and segregation of skinless and encased frankfurters, it also can be used for the classification and segregation of any polygonal or cylindrical items or combination thereof whose surfaces have different coefficients of friction. Similarly, the classification of the unit items may be utilized where the unit items are of different weight. In such a case, the classifying surfaces will separate the unit items in direct proportion to the co-efficients of friction of the unit items.

Primarily, however, the invention provides a simple and automatic classification and segregation of unit items whose surfaces have different coefficients of friction, and is particularly directed to encased and skinless frankfurters.

Since it is obvious that various changes and modifications may be made in the above description without departing from the nature or spirit thereof, this invention is not restricted thereto, except as set forth in the appended claims.

What is claimed is:

1. An apparatus for classifying and segregating unit items having different coefficients of friction, which comprises a driven classifying surface adapted to frictionally engage and drive a succession of unclassified unit items in one direction, means for driving said classifying surface in said one direction, and means for feeding said unit items onto said classifying surface, said classifying surface linearly projecting said unit items in free flight trajectories in said one direction and in direct proportion to their coefficients of friction.

2. An apparatus for classifying and segregating cylindrical unit items having different coefficients of friction, which comprises a driven classifying surface of a plurality of rolls and adapted to frictionally engage a succession of unclassified cylindrical unit items, and means for feeding said unit items onto said classifying surface, said classifying surface linearly projecting said cylindrical unit items in free flight trajectories in accordance with their coefficients of friction.

3. An apparatus as claimed in claim 2 wherein the cylindrical unit items having different coefficients of friction are skinless and encased frankfurters with said classifying surface projecting the former further than the latter.

4. An apparatus as claimed in claim 2 wherein the classifying surface is inclined upwardly from the horizontal.

5. An apparatus as claimed in claim 2 wherein the classifying surface comprises a plurality of rolls, each having a shape consisting of two equal right conical frustums contiguous at the minor diameter.

6. An apparatus as claimed in claim 2 wherein the classifying surface comprises polymerized tetrachlorethylene.

7. An apparatus as claimed in claim 2 wherein the length of the classifying surface is greater than the length of the cylindrical unit items.

8. An apparatus as claimed in claim 2 wherein the classifying surface is inclined upwardly from the horizontal at an angle between about 12° and 20°.

9. An apparatus for classifying and segregating cylindrical unit items having different coefficients of friction, such as skinless and encased frankfurters, which comprises a classifying surface inclined upwardly from the horizontal, adapted to frictionally engage said cylindrical unit items, having a length greater than the length of the cylindrical unit items and comprising a plurality of rolls, each roll having the shape of two equal right conical frustums joined at the minor diameter; means for feeding a succession of unclassified cylindrical unit items onto said classifying surface, and means for rotatably overdriving said rolls in the direction of delivery thereon of the cylindrical unit items and at a surface speed greater than the speed of delivery of the cylindrical unit items, whereby said cylindrical unit items are projected from said overdriven classifying surface in free flight trajectories in accordance with their coefficients of friction.

10. An apparatus as claimed in claim 9 in which the classifying surface is inclined upwardly from the horizontal at an angle between about 12° and 20°.

11. An apparatus as claimed in claim 9 in which the classifying surface comprises polymerized tetrachlorethylene.

12. An apparatus as claimed in claim 9 wherein the means for projecting a succession of unclassified cylindrical unit items onto the classifying surface comprises a discharge belt of a peeling machine.

13. In combination with an apparatus for peeling frankfurters, a surface positioned to receive the frankfurters projected from the peeling apparatus, said surface comprising a plurality of rolls inclined upwardly from the horizontal, and having a collective length greater than the length of the frankfurters, and means for rotatably overdriving said rolls in the direction of the delivery of the frankfurters and at a surface speed greater than the speed of projection of the frankfurters onto the plurality of rolls, whereby said frankfurters are selectively projected from the terminal surface of said overdriven rolls in free flight trajectories in accordance with their individual coefficients of friction.

14. A method of classifying and segregating unit items whose surfaces have different coefficients of friction, which comprises feeding the unit items onto a classifying surface adapted to frictionally engage said unit items, and driving said classifying surface at a speed greater than the speed of delivery of the unit items whereby said unit items are projected from the classifying surfaces in free flight trajectories in direct proportion of their respective coefficients of friction.

15. A method of classifying and segregating cylindrical unit items whose surfaces have different coefficients of friction, which comprises projecting the unit items onto a classifying surface adapted to frictionally engage said unit items, and moving the unit item in an upward direction on said classifying surface at a speed greater than the speed of delivery of the unit items, whereby said cylindrical unit items are projected from the classifying surfaces in free flight trajectories in accordance with their respective coefficients of friction.

16. A method as claimed in claim 15 wherein the cylindrical unit items are skinless and encased frankfurters.

17. A method as claimed in claim 15 wherein the classifying surface is inclined upwardly from the horizontal.

References Cited in the file of this patent

UNITED STATES PATENTS

| | | |
|---|---|---|
| 732,519 | Claypool | June 30, 1903 |

FOREIGN PATENTS

| | | |
|---|---|---|
| 553,111 | Belgium | June 1, 1957 |
| 757,994 | Great Britain | Sept. 26, 1956 |